UNITED STATES PATENT OFFICE.

HARRY BARRINGER COX, OF BEDFORD HILLS, NEW YORK.

RUBBER PRODUCT.

1,202,759.  Specification of Letters Patent.  Patented Oct. 24, 1916.

No Drawing. Original application filed January 16, 1913, Serial No. 742,402. Divided and this application filed July 29, 1914. Serial No. 853,804.

*To all whom it may concern:*

Be it known that I, HARRY BARRINGER COX, a citizen of the United States, residing in Bedford Hills, county of Westchester, and State of New York, have invented a new and useful Rubber Product, of which the following is a division of my former application, filed January 16, 1913, Serial No. 742,402.

The methods now in use for the recovery of rubber stock from old vulcanized rubber generally involve the subjection of the rubber under various conditions of heat, with or without pressure, to aqueous solutions of one kind or another. These processes not merely injure the gum itself, but also affect to a very substantial extent the substances with which it is compounded, so that the resulting stock is very much inferior to the original stock and differs from it substantially with respect to many of its elements. Said processes moreover are cumbersome, laborious and expensive.

I have discovered a process whereby the stock produced is maintained in close approximation to the original stock retaining the original qualities of the gum approximately unimpaired, and also the original compounds so far as their usefulness is concerned. My process moreover is neither cumbersome, laborious nor expensive.

Although I do not wish to be understood as limiting myself to the attainment of all of the above results, or to the most perfect form of my process, I will now proceed to describe the process as I at present prefer to carry it out. I first prepare what I will herein refer to as my "resin solution," which I believe to be new *per se*, and which I prefer to prepare as follows: I purify commercial resin by heating it until it boils and continuing the boiling until I evaporate the contained water and other volatile substances. This boiling lasts about two hours and is continued until the resin stops foaming. I then permit the resin to cool and grind it to a fine powder. Any commercial resin may be employed although I preferably employ rubber resin. I next dissolve the resin at ordinary temperature in gasolene and allow the insoluble parts of the resin to settle and decant off the solution. I may use two pounds of the purified resin to 100 pounds of gasolene, where the resin solution is to be employed for the treatment of automobile tire tread stock. For lower grades of stock a higher percentage of resin to the gasolene is preferable—sometimes as high as 4%. For higher grades of stock the percentage of resin will be lower—sometimes as low as 1%.

The resin solution is very much less volatile than is gasolene without the resin.

I grind the rubber stock to be treated to about the fineness of coarse sand to facilitate absorption of the resin solution. I put the stock in an open tray and pour over it sufficient resin solution.

In determining the amount of resin solution to be used for a given quantity of vulcanized stock I calculate the amount of resin that I believe to be necessary to replenish the stock with the freed resin that has been affected by vulcanization, and employ an amount of resin solution containing this calculated amount of resin. I have found in practice that a proportion of about 3 pounds of resin to over 100 pounds of ground automobile tire tread stock will answer the purpose.

As the resin solution is absorbed the stock will swell say from two to four times its bulk, depending upon the quality of the stock, and also upon the amount of gasolene employed as the vehicle for carrying the resin into the stock. I let the mass stand preferably until it has stopped swelling, which may take about an hour. I next heat gently and uniformly until the mass becomes tacky. For this purpose I prefer a heat about from 190 to 200° F. for about from four to twenty hours, depending upon the quality of the stock. The greater the mineral matter in the stock the less time is required. Or the length of time of this heating may be lessened to about one hour by subjecting the mass to live steam of about twenty pounds pressure. This reduction in time is, however, at the expense of a somewhat lower quality of product because of the increased heat. In this step, length of time is more or less a substitute for heat so that the operation might take place at ordinary temperature in about from ten to fifteen days. I next remove the gasolene from the mass either by distillation, by vacuum extraction, or by live steam. I next dry the stock, if necessary, and it is then in condition to be milled.

The recovered stock thus produced differs from the present ordinary devulcanized stock in the following respect: The tensile strength of present ordinary devulcanized rubber I understand to be less than 50% of the original, whereas the tensile strength of my product is above 50% and may be as high as 90% of the original.

The stock is characterized by ease and rapidity of milling. The gum is approximately unimpaired. The mineral compounds remain to such an extent that the stock does not have to be recompounded. Even though certain of the mineral compounds, as for example the litharge, have been changed by the original vulcanization they still may retain their efficiency as fillers in their changed form.

Compared with original unvulcanized stock, my stock differs in not being soluble in gasolene, whereas original unvulcanized stock is soluble therein. Moreover by application of heat my stock may be reduced to a liquid solution in said resin solution, whereas under similar conditions original unvulcanized stock is reduced to a viscous consistency.

My theory of the operation which takes place in the above process is as follows: During the process of vulcanization it appears that there is a change in the constitution of the resin or a more or less complete volatilization thereof, and that the above process replenishes the gum with resin to take the place of that so changed or volatilized in the vulcanization. This replenished resin may in turn be changed, etc., by revulcanization and again replenished, and this replenishment and revulcanization may occur as many times as it is desired to rework the product.

Whatever kind of resin I employ in making my resin solution, I may improve said solution by adding thereto a small percentage of vulcanized gum stock which has been reduced to a liquid by the resin solution and heat as above described. The addition of rubber resin to stock which has been partially or in whole deprived of its original content of rubber resin serves practically to reduplicate the original unvulcanized rubber. Thus an approximation of the physical and chemical properties of the original rubber may be attained in the reworked rubber.

By a proper arrangement of apparatus the gasolene which is used as the vehicle of the resin in one operation of my process may be recovered as it escapes from the stock and may be used over again in subsequent operations of my process.

I do not wish to be understood as limiting myself to gasolene as a carrier medium for the resin to the exclusion of other carrier mediums for resin. I may use naphtha or kerosene as a carrier medium for the resin.

In case the old vulcanized rubber to be treated is combined with fiber, I remove the fiber preliminarily in my treatment of the rubber.

Having produced my recovered stock as aforesaid and milled the same, I may prepare it for revulcanization by mixing it with the calculated amount of sulfur necessary to combine with the amount of resin with which I have replenished it by my said process.

The approximation of my recovered stock to the original is such that it is revulcanizable in the same time and temperature as that taken in the original vulcanization. Therefore, a factory employing my process may with impunity mix its recovered stock with its new stock because both of them are adapted to the same time and temperature of vulcanization, therefore the conditions which properly vulcanize one would properly vulcanize the other when the two are mixed.

What I claim and desire to secure by Letters Patent of the United States is—

1. A product comprising recovered rubber stock replenished with rubber resin.

2. A product comprising recovered rubber stock replenished with resin, and a material obtained by dissolving vulcanized gum in rubber resin.

In testimony whereof I have hereunto signed my name in the presence of two subscribing witnesses.

HARRY BARRINGER COX.

Witnesses:
ADELAIDE FOSHAY,
ALFREEDA G. THAANUM,